Feb. 27, 1923.
S. H. M. FOWLER,
GRAIN DISTRIBUTOR FOR CONVEYER BELTS,
FILED APR. 5, 1922.
1,447,069.
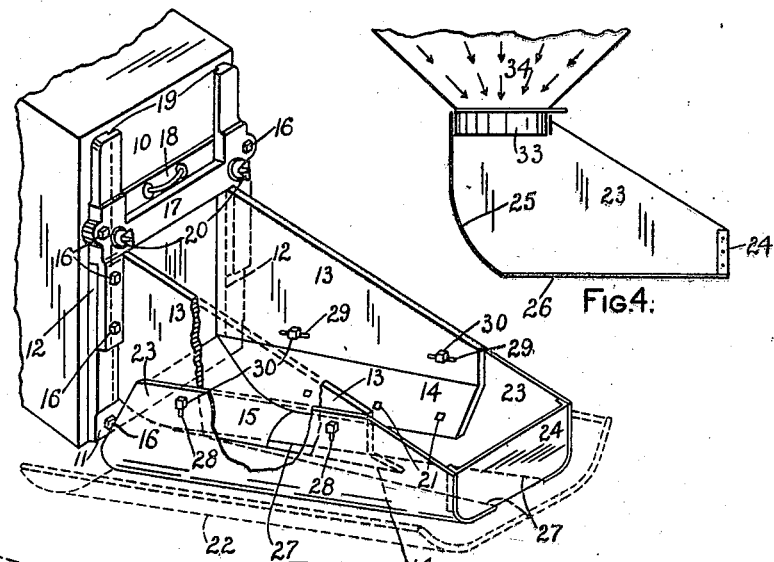
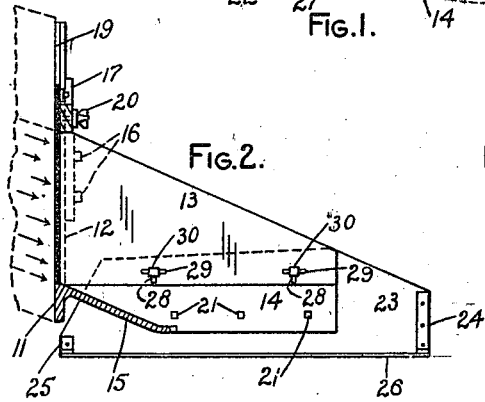
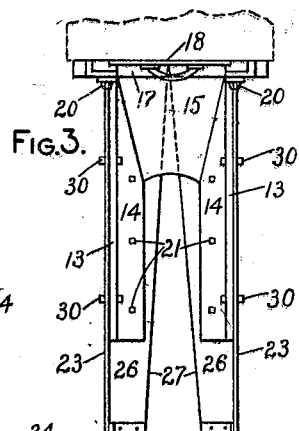
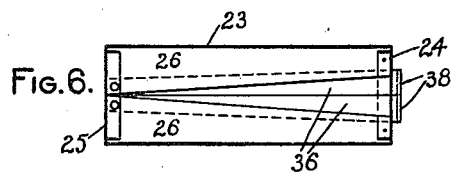
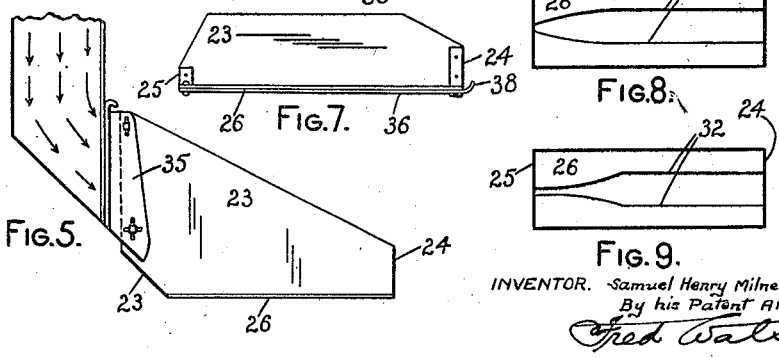
INVENTOR. Samuel Henry Milne Fowler,
By his Patent Attorney.
Fred Walsh Patented Feb. 27, 1923.

1,447,069

UNITED STATES PATENT OFFICE.

SAMUEL HENRY MILNE FOWLER, OF JUNEE, NEW SOUTH WALES, AUSTRALIA.

GRAIN DISTRIBUTOR FOR CONVEYER BELTS.

Application filed April 5, 1922. Serial No. 549,666.

*To all whom it may concern:*

Be it known that I, SAMUEL HENRY MILNE FOWLER, a subject of the King of Great Britain, residing formerly at Parkes but now at Junee, in the State of New South Wales and Commonwealth of Australia, have invented new and useful Improvements in and Relating to Grain Distributors for Conveyer Belts, of which the following is a specification.

This invention refers to chutes and conveyer belts for grain and the like specially those discharging from silos and other overhead storage and relates more particularly to the distribution of grain from the feeding chute on to the conveyer belt below. Heretofore the grain falling from the chute unevenly distributed itself on the conveyer belt and more or less splashed thereover and on stoppage of the belt motion the grain heaped up and overflowed from said belt until the feed was cut off.

Now this invention has been specially devised so that the grain from the chute will be more evenly distributed on the belt than heretofore so that opportunity for cut off of the feed before overflow of grain will be afforded and so that on stoppage of the belt motion splashing and overflow will be hindered so that a belt of less width than heretofore may be used and so that the life of the belt will be prolonged and thus providing a novel and effective grain distributor for conveyer belts simple in construction and quick and effective in operation.

The distributor is of more or less trough shape with curved or straight or other sides of a convenient height to affix to the chute sides and of sufficient size to hold a surplusage of grain that is to say to hold more grain than can be discharged therefrom in a given time. The bottom of the distributor has an opening having smaller superficial area for longitudinal unit running rearwardly as resulting from tapering it and may have a suitable area reducing and enlarging controls.

But in order that this invention may be readily carried into practical effect various constructions of grain distributors and applications thereof according to these present improvements will now be described with reference to the drawings accompanying and forming part of this complete specification.

In the drawings which are all more or less diagrammatic Fig. 1 is a perspective view of an improved grain distributor fitted to a silo chute as ordinarily used. Fig. 2 is a medial longitudinal section of Fig. 1 and Fig. 3 is a plan of same. Fig. 4 is a sectional view of another construction of improved grain distributor fitted to a hopper or bottom discharge. Fig. 5 is a similar view of a further construction of distributor fitted to a chute side discharge. Figs. 6 and 7 show in plan and medial section a grain distributor with closable bottom doors and Figs. 8 and 9 are plans showing different shapes of the distributor discharge openings.

In the arrangement shown in Figs. 1 2 and 3 of the drawings a chute of ordinary construction say a casting consisting of a base plate 11 and integral therewith two horns 12 and two chute sides 13 the latter with lower inwardly directed flanges 14 joining a more or less short curved and sloping bottom 15 is bolted to the front wall 10 of a silo discharge end by bolts 16. At top of the chute is an H-frame 17 bolted through horns 12 to wall 10. A vertical sliding door 18 in grooves 19 in the H-frame 17 and horns 12 is provided to adjustably close the silo discharge orifice in wall 10 and there are locking screws 20 at each side of said H-frame 17 to lock said door 18 in any position. Orifices 21 are provided in the chute flanges 14 for affixture of rubber curtains necessary in the absence of the main elements of this invention.

A grain distributor of more or less trough shape is adjustably affixed by bolts 30 through vertical slots 28 in its sides and through horizontal slots 29 in the chute sides 13 to the chute. This distributor has side walls 23 a front wall 24 a rear wall 25 and a bottom wall 26 all suitably riveted or otherwise affixed together. The bottom wall 26 has a V-shaped opening 27 and as shown has no closing or opening regulating device for this simplest construction of grain discharge bottom for the distributor.

In use the door 18 of the silo discharge being opened the grain flows on to and along the inclined bottom 15 of the chute and being guided by the side walls 13 and flanges 14 falls into the distributor and flows through the V-opening 27 in the bottom wall 26 thereof in a more or less steady stream to the conveyer belt 22 (shown in dotted lines in Fig. 1) and distributes more or less evenly on said belt 22 (by reason of the V-opening) which carries it away.

Should the conveyer belt 22 stop the grain will but slightly pile up thereon but will heap up in the distributor and bank back or dam the flow upon the distributor and through its discharge opening 27 thus giving time for the shutting of the chute door 18 before overflow.

The front wall 24 enables a shorter distributor to be used and causes the grain to spread on belt 22. Front wall 24 tends to prevent the grain from spillage should the discharge door 18 be opened before the belt 22 be started, thus causing the grain to be more or less banked up on said belt 22, though said wall 24 with the narrowing opening 27 keeps a surplus back. By regulating the height of grain on said belt 22 by extent of opening of said door 18 there is no possibility of said grain fouling any chutes positioned forwardly and in series therewith. If desired however the front wall 24 and the rear wall 25 may be dispensed with.

Instead of the opening 27 being of V-shape it may be of any other suitable tapered shape such as for example it might be shaped as shown at 31 in Fig. 8 or as at 32 in Fig. 9.

Referring to the distributor shown in Fig. 4 the rear wall 25 is slightly outwardly convexed and affixed at its upper end to a band 33 at the bottom of a chute end or a hopper 34 which has a horizontal discharge opening. The bottom 26 has a discharge slot as above described either tapering or any other convenient shape.

In the construction of the distributor shown in Fig. 5 the rear wall 25 is inclined forwardly and the ordinary chute as shown in Figs. 1 2 and 3 is dispensed with and the distributor is bolted direct to a flange 35 at either side of the discharge opening by bolts passing through slots in side walls 23 to allow of longitudinal adjustment of the distributor.

As shown in Figs. 6 and 7 the distributor has its V-slot 27 closable and the extent of opening thereof regulatable. Below the bottom wall 26 are two sector slides 36 pivotally secured at rear and resting upon bar 27 across the distributor at the fore end and preferably provided with hand grips 38 so that they may be radially moved over slot 27 and alter its area. The slides 36 may be used in the before described constructions of distributors to control the flow of grain to the conveyor belt.

A distributor without slides such as 36 may have its fore wall 24 in two overlapping free parts so that they may be moved transversely and so more widely open the V-slot 27 or partly close it and having slots and bolts or other locking devices for securing them in any set position.

It will be understood that although several different constructions of distributors have been herein described each of these again may be varied considerably to suit individual requirements without departing from the nature and scope of this invention.

What I claim as my invention and desire to secure by Letters Patent is:—

1. A distributor for conveyer belts comprising a substantially trough-shaped body adapted for affixion to a grain discharge chute, and having a bottom discharge opening decreasing in area toward the rear.

2. A distributor for conveyer belts comprising a substantially trough-shaped body adapted for affixion to a grain discharge chute and of sufficient size to hold more grain than can be discharged therefrom in a given time, substantially as described.

3. A distributor for conveyer belts comprising a substantially trough-shaped body adapted for affixion to a grain discharge chute and of sufficient size to hold more grain than can be discharged therefrom in a given time, said body having a bottom discharge opening with decreasing superficial area per longitudinal unit running rearwardly, substantially as described.

4. A distributor for conveyer belts comprising a substantially trough-shaped body adapted for affixion to a grain discharge chute and having a bottom discharge opening decreasing in area toward the rear, and means for regulating the area of said discharge opening.

5. A distributor for conveyer belts comprising a substantially trough-shaped body adapted for affixion to a grain discharge chute and having a bottom discharge opening decreasing in area toward the rear, and means for regulating the area of the bottom discharge opening while maintaining the tapering character of the opening.

6. A distributor for conveyer belts comprising a substantially trough-shaped body adapted for affixion to a grain discharge chute and having a bottom discharge opening decreasing in area toward the rear, and elements pivotally secured to the body and adapted by movement toward each other to close the said discharge opening.

7. A distributor for conveyer belts comprising a substantially trough-shaped body adapted for affixion to a grain discharge chute and having in the bottom a substantially triangular discharge opening with the base of the triangle toward the front of the body, and a pair of elements pivotally secured to the back of the body and adapted by movement toward each other to close the discharge opening while maintaining until final closure the general triangular shape of the opening.

8. A distributor for conveyer belts comprising a substantially trough-shaped body having in the bottom a V-shaped discharge opening with the small end at the rear of the body, and means at the rear for affixing the body to a grain discharge chute.

9. A distributor for conveyer belts comprising a base plate having secured thereto vertical spaced walls each having at the bottom an inwardly inclined flange, a sloping bottom piece extending from the base plate and joining the adjacent edges of the flanges over a portion of their length, a member constituting a bottom wall carried by the said vertical walls and underlying the opening between the unconnected portions of the said flanges and having directly underneath said opening a substantially triangular discharge opening, and means for securing the base plate to a grain discharge chute.

10. A distributor for conveyer belts comprising a base plate having spaced uprights at each end, a frame secured to the uprights and having guides for a door adapted to control the space between the uprights, vertical side walls extending forwardly from the uprights, a sloping bottom extending forwardly from the base and joining the bottom edges of the side walls over a portion of their length, and a bottom wall carried by the side walls below said sloping bottom and having a discharge opening therein decreasing in area toward the said base plate.

11. A distributor for conveyer belts comprising a base plate having spaced uprights at each end, a frame secured to the uprights and having guides for a door adapted to control the space between the uprights, vertical side walls extending forwardly from the uprights, a sloping bottom extending forwardly from the base and joining the bottom edges of the side walls over a portion of their length, a bottom wall carried by the side walls below said sloping bottom and having a discharge opening therein decreasing in area toward the said base plate, and means for regulating the area of the bottom discharge opening.

12. A distributor for conveyer belts comprising a hollow body having side walls, a bottom wall adjustable with respect to the side walls, and a discharge opening in said bottom wall, substantially as described.

In testimony whereof I have signed my name to this specification in the presence of two subscribing witnesses.

SAMUEL HENRY MILNE FOWLER.

Witnesses:
    A. BURNES,
    N. SLADEN.